United States Patent
Loges

(10) Patent No.: US 10,509,094 B2
(45) Date of Patent: Dec. 17, 2019

(54) METHOD FOR DETERMINING THE DIRECTION OF A SOURCE OF WATERBORNE SOUND, A COMPUTER PROGRAM PRODUCT, A COMPUTER OR SONAR, AND A WATERCRAFT

(71) Applicant: ATLAS ELEKTRONIK GMBH, Bremen (DE)

(72) Inventor: Werner Loges, Bremen (DE)

(73) Assignee: ATLAS ELEKTRONIK GMBH, Bremen (DE)

( * ) Notice: Subject to any disclaimer, the term of this patent is extended or adjusted under 35 U.S.C. 154(b) by 315 days.

(21) Appl. No.: 15/555,623

(22) PCT Filed: Feb. 9, 2016

(86) PCT No.: PCT/DE2016/100055
§ 371 (c)(1),
(2) Date: Sep. 5, 2017

(87) PCT Pub. No.: WO2016/141917
PCT Pub. Date: Sep. 15, 2016

(65) Prior Publication Data
US 2018/0081023 A1    Mar. 22, 2018

(30) Foreign Application Priority Data
Mar. 6, 2015    (DE) .......................... 10 2015 103 322

(51) Int. Cl.
*G01S 3/805*    (2006.01)
(52) U.S. Cl.
CPC .................................. *G01S 3/805* (2013.01)

(58) Field of Classification Search
CPC ......................................................... G01S 3/805
See application file for complete search history.

(56) References Cited

U.S. PATENT DOCUMENTS

| | | | | |
|---|---|---|---|---|
| 4,202,050 A * | 5/1980 | Klein | .................... | B06B 1/0611 |
| | | | | 367/105 |
| 6,671,227 B2 * | 12/2003 | Gilbert | ................ | G01S 7/52085 |
| | | | | 367/138 |
| 8,811,120 B2 * | 8/2014 | Bachelor | .................. | G01S 15/89 |
| | | | | 367/103 |

(Continued)

FOREIGN PATENT DOCUMENTS

| AU | 2016228475 A1 * | 9/2017 | ............. | G01S 3/805 |
|---|---|---|---|---|
| AU | 2016228475 B2 * | 10/2018 | ............. | G01S 3/805 |
| CA | 2975332 A1 * | 9/2016 | ............. | G01S 3/805 |

(Continued)

OTHER PUBLICATIONS

Translation DE102009047941 (Year: 2011).*
International Search Report for PCT/DE2016/100055 dated Jun. 17, 2016; English translation submitted herewith (5 pages).

*Primary Examiner* — Daniel Pihulic
(74) *Attorney, Agent, or Firm* — Fitch, Even, Tabin & Flannery LLP

(57) ABSTRACT

The invention relates to a method for determining the direction of a source of waterborne sound that emits a waterborne acoustic signal, by means of a hydrophone arrangement which forms a linear antenna or a virtual linear antenna, as well as to a computer program product, a computer, a sonar, and a watercraft.

23 Claims, 2 Drawing Sheets

(56) References Cited

U.S. PATENT DOCUMENTS 9,829,565 B1 * 11/2017 Crocker .................. G01S 5/183
2018/0081023 A1 * 3/2018 Loges ..................... G01S 3/805

FOREIGN PATENT DOCUMENTS

| CA | 2975332 C * | 3/2019 | ............ G01S 3/805 |
| DE | 102009047941 B3 | 3/2011 | |
| DE | 102015103322 A1 * | 9/2016 | ............ G01S 3/805 |
| EP | 0715182 A1 | 6/1996 | |
| EP | 3265838 A1 * | 1/2018 | ............ G01S 3/805 |
| WO | WO-2016141917 A1 * | 9/2016 | ............ G01S 3/805 |

* cited by examiner

METHOD FOR DETERMINING THE DIRECTION OF A SOURCE OF WATERBORNE SOUND, A COMPUTER PROGRAM PRODUCT, A COMPUTER OR SONAR, AND A WATERCRAFT

CROSS-REFERENCE TO RELATED APPLICATIONS

This application is a U.S. national phase application filed under 35 U.S.C. § 371 of International Application No. PCT/DE2016/100055, filed Feb. 9, 2016, designating the United States, and claims priority from German Patent Application No. 10 2015 103 322.4, filed Mar. 6, 2015, and the complete disclosures of which applications are hereby incorporated herein by reference in their entirety for all purposes.

FIELD

The invention relates to a method for determining the direction of a source of waterborne sound that emits a waterborne acoustic signal by means of a hydrophone arrangement which forms a linear antenna or a virtual linear antenna, as well as to a computer program product, a computer, a sonar, and a watercraft.

BACKGROUND

Detecting an object from an underwater vehicle is usually a difficult task because both the direction (bearing) and also the distance must be determined. The further away the object to be detected, the greater effect that possible errors have on determining the direction angle (bearing angle).

Particularly with side-scan sonars (passive flank-array sonar or active side-scan sonar) which, for example, form a linear antenna, the linear antenna is rotated step-by-step electronically or under computer control, and the corresponding incoming signal strength determined. The angle with the greatest beam-formed signal strength corresponds to the direction angle on the basis of which a downstream range determination, for example, is made.

To reduce the error in determining the direction, the electronic rotation of the linear antenna can be performed with smaller step-widths. This does, however, have the drawback of considerably increasing the corresponding computing effort and of the results not being available within an acceptable time.

Consequently, a method must be provided by which the most accurate direction (bearing) possible can be determined within two measurement periods.

SUMMARY

The aim of the invention is to improve the state of the art.

The aim is achieved by a method of determining the direction of a source of waterborne sound which emits a waterborne acoustic signal, doing so by means of a hydrophone arrangement which forms a linear antenna or a virtual linear antenna, wherein the method has the following steps:
  Determining the waterborne acoustic signal incoming at the hydrophone arrangement at a first measurement time $t_1$,
  Performing an electronic antenna swing analysis which determines a sum signal S of the linear antenna or of the virtual signal antenna at every rotation angle $\alpha_n = \alpha_0 \pm n\Delta\alpha$, where $\alpha_0$ is the starting angle, $\Delta\alpha$ is the step-width angle, and $n = 0, 1, 2, 3, 4 \ldots$, such that a measurement series $S(\alpha)$ is created,
  Determining a maximum sum signal $S_{max}(\alpha_{max})$, where $\alpha_{max}$ is the maximum rotation angle of the measurement series $S(\alpha)$,
  Determining a fit measurement series $S_{Fit}(\alpha)$, which includes the maximum sum signal $S_{max}(\alpha_{max})$ and at least two more sum signals $S(\alpha_n)_m$, with the sum number $m = 2, 3, 4 \ldots$,
  Determining a mathematical fit function $f_{Fit}(\alpha_{Fit})$ for the fit measurement series $S_{Fit}(\alpha)$ by means of a mathematical equalization calculation, and
  Determining a fit function maximum $f_{Fit,Max}(\alpha_{Fit,Max})$ of the mathematical fit function $f_{Fit}(\alpha_{Fit})$, wherein the direction of the waterborne sound source can be determined by means of $\alpha_{Fit,Max}$.

In this way, a fast method can be provided which supplies an improved indication of direction (bearing) within a single measuring interval (measurement time). In addition, the number of hydrophones and/or the computing effort can be reduced or, corresponding to the step-width angle, increased. In particular, this is achieved according to the invention by the mathematical fit procedure and determination of the corresponding fit function maximum being able to be carried out very rapidly. In addition, this in turn leads to an improvement in determining direction.

BRIEF DESCRIPTIONS OF THE DRAWINGS

DETAILED DESCRIPTION

Figure 1:
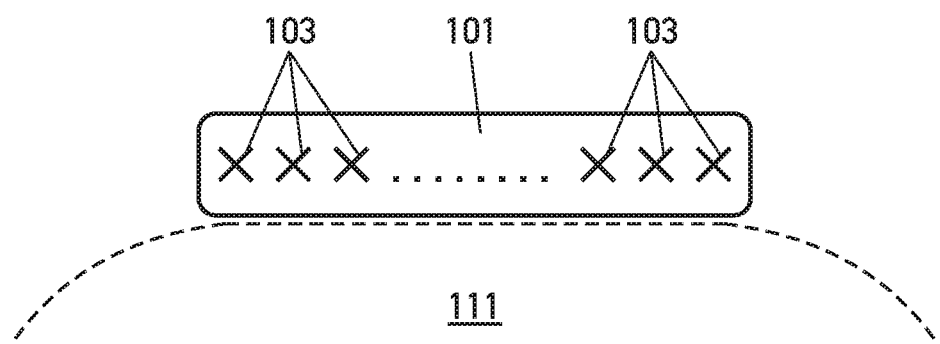
FIG. 1 is a very schematic representation of a side-scan sonar (flank array) with 151 individual hydrophones, which is arranged on a submarine.

It will be useful to clarify certain terms:

By 'determination of direction' is meant determining the direction of the underwater sound source with respect to a reference point
for example, the center and/or the pivot point of the linear antenna. In this context, the term 'bearing' is also used instead of the term 'direction.' Direction and bearing are to be understood here as synonymous.

A 'waterborne sound source' is, in particular, a natural or artificial object which emits sound waves from a localized region. This could be, for example, a ship's engine and/or a point source. In addition, a waterborne sound source is also an artificial or natural object which reflects a previously-emitted, underwater acoustic signal. For example, an underwater vehicle lying 'on the lookout,' which is pinged by waterborne sound from an active sonar of another watercraft and thus reflects the waterborne acoustic signal, is here understood as a waterborne sound source.

A 'waterborne acoustic signal' is, in particular, an acoustic transient signal in the water with a time duration of 10 ms to 200 ms, which can extend, in particular, to a range from 2 Hz to several hundred kHz, with a signal shape which is frequency-modulated and/or has a constant wavelength.

A 'hydrophone arrangement' includes, in particular, at least two piezoceramic elements in which the waterborne acoustic signal creates a voltage change which is processed by signal technology. The more hydrophones are fitted, the better can frequencies and/or directions be resolved. In the present case, such a hydrophone arrangement comprises, in particular, between 50 and 300 hydrophones.

A 'linear antenna' is, in particular, present when the individual hydrophones of the hydrophone arrangement are arranged along a straight line. This is, for example, the case with a side-scan sonar. However, even curved hydrophone arrangements or, for example, hydrophone arrangements with a cylindrical basis can form a linear antenna, which in the present case is referred to as a virtual linear antenna, since such arrangements are converted by signal technology or by computer technology into a linear antenna. In this regard, see Manfred Siegel, Einführung in die Physik und Technik der Unterwasserschallsysteme [Introduction to the Physics and Technology of Underwater Sound Systems] (ISBN 3-936799-28-8), pages 5-52 to 5-60, the relevant content of which forms a constituent part of the present application.

A 'first measurement time $t_1$' covers one time period or one time interval, so that the antenna swing analysis can be carried out. During this first measuring time, the voltage, in particular, present at each hydrophone due to the waterborne acoustic signal is determined by measurement technology. Consequently, a measurement signal which varies over the measurement time is present for the measurement time.

An 'electronic antenna swing analysis' is a delay which differs computationally or electronically for each individual hydrophone, so that the linear antenna is rotated or curved electronically or computationally. In this regard, see Manfred Siegel, Einführung in die Physik und Technik der Unterwasserschallsysteme [Introduction to the Physics and Technology of Underwater Sound Systems] (ISBN 3-936799-28-8), pages 5-41 to 5-60, the relevant content of which forms a constituent part of the present application. This rotation or curvature is effected, in particular, by the individual hydrophones being 'read' with a different time delay, so that 'time-delayed' hydrophones are obtained.

The 'sum signal S' is, in particular, the cumulative signal of all (time-delayed) hydrophones. The sum signal can be determined, not only for a single frequency, but also for a single frequency interval. Furthermore, the signal levels at the hydrophones can simply be added together. The sum signal is thus a measure of the sound energy present at the linear antenna or the virtual linear antenna. The sum signal is determined at each individual rotation angle $\alpha_n = \alpha_0 \pm n\Delta\alpha$ so that the sum signal S is present at each rotation angle $\alpha_n$.

The 'rotation angle' is created by the rotation under electronic or computer control of the linear antenna or the virtual linear antenna about a pivot point. In particular, the antenna is rotated in each case with a step-width angle of $\Delta\alpha = 180°/\text{hydrophones\_number}/k$ (in degrees; full circle 360°) (k=3, 5, 7 . . . is the fine bearing factor), (for example, for an antenna with 18 hydrophones and k=5, $\Delta\alpha$ will be 2°), so that, with an angular segment of 180°, a total of 90 sum signal angles S will be determined. These 90 sum signal values S, together with the associated rotation angles, will then, in particular, be saved under 'measurement series $S(\alpha)$.'

In order to determine the 'maximum sum signal $S_{max}(\alpha_{max})$,' the quantitatively largest sum signal S from the measurement series $S(\alpha)$ is determined. This can be done with, for example, a so-called 'quicksort' or 'bubble sort' algorithm. The maximum rotation angle $\alpha_{max}$ is then the angle $\alpha$ of the maximum signal $S_{max}$ thus determined.

To determine the 'fit measurement series $S_{Fit}(\alpha)$,' at least two more sum signals $S(\alpha_n)_m$ are determined in addition to the maximum sum signal $S_{max}(\alpha_{max})$. The m subscript here denotes the number of additional sum signals present in the fit series $S_{Fit}(\alpha)$ alongside the maximum sum signal $S_{max}(\alpha_{max})$.

To achieve a particularly good result, the sum signals directly adjacent to the maximum sum signal $S_{max}(\alpha_{max})$, in particular, are also included in the fit series. In particular, the sum signals symmetrically flanking the maximum sum signal $S_{max}(\alpha_{max})$ are used. The fit measurement series $S_{Fit}(\alpha)$ thus includes at least three measured values. In case of the symmetrical use of additional sum signals, the fit measurement series 5, 7, 9, . . . includes sum signals.

A 'mathematical fit function $S_{Fit}(\alpha)$' is determined for the measured values saved in the fit measurement series $S_{Fit}(\alpha)$, including the maximum sum signal $S_{max}(\alpha_{max})$. The determination of a mathematical fit function of this kind is also referred to as regression. For example, the assumption is made that three measured values saved in the fit measurement series can be described by a second-degree polynomial $(\alpha_0 + \alpha_1 x + \alpha_2 x^2)$. The parameters of the second-degree polynomial are thus defined such that, ideally, all three points lie on the determined mathematical fit function.

In particular, it may be the case here that the metrologically-determined, maximum rotation angle does not agree with a maximum rotation angle of a local minimum of the mathematical fit function, but it also, surprisingly, turns out that the local or global maximum often results in a much more correct rotation angle for determining the direction of an underwater sound source. In this way, a fit measurement function maximum $f_{Fit,Max}(\alpha_{Fit,Max})$ of the mathematical fit function $f_{Fit}(\alpha_{Fit})$ is determined, in particular, numerically or analytically. In particular, the direction of the waterborne sound source is orthogonal to a linear antenna or virtual linear antenna with the rotation angle $\alpha_{Fit,Max}$ determined by the fit function, wherein the orthogonal here intersects the pivot point, in particular, of the linear antenna or virtual linear antenna.

In order to improve the quality and, thus, the reliability of the direction of the waterborne sound source, the procedure or sub-steps of the procedure can be carried out at a second measurement time $t_2$, at a third measurement time $t_3$, at a fourth measurement time $t_4$, and/or at further times t, wherein the corresponding measurement series $S(\alpha)_t$ or the determined directions of the waterborne sound source are averaged.

This approach delivers excellent results, particularly in the case where the waterborne sound source is not moving. The corresponding measurement times emerge from the corresponding repetition rate, in particular, at which the hydrophone arrangement is interrogated electronically or computationally, or from an overlaid window function which is superimposed as a filter on the corresponding measurement curves of the hydrophone.

To also allow determination of the direction of the waterborne sound source at the end of the procedure, in this embodiment, the remaining steps of the method according to the invention are also carried out.

In another embodiment, the additional sum signals are sum signals adjacent to the maximum sum signal $S_{max}(\alpha_{max})$.

This makes it possible to obtain a high measured value density around the maximum sum signal, so that the area around the maximum signal is particularly well-reproduced by the mathematical fit function.

In order to compensate for antenna-specific properties, the mathematical fit function can be a polynomial function, a Gaussian function, a Lorentz function, or a Voigt function.

Both the Gaussian function and the Lorentz function describe bell curves, while, for example, the Voigt function is, in particular, a convolution of the Gaussian function and the Lorentz function in which, for example, broadening effects on the underwater sound due to the water and its properties can be compensated for.

In another aspect, the aim is achieved by a computer program product which is set up so that the previously described method can be implemented with a computer or a sonar.

A software application can thus be provided on a data medium, said software sending instructions to a computer or a sonar such that the above-described method according to the invention can be implemented. In this way, existing computer systems and/or sonars can therefore be adapted to enable them to carry out the procedure.

In another aspect, the aim is achieved by a computer which is set up in such a way that a previously described method can be implemented.

In addition, in another aspect, the aim is achieved by a sonar, which is set up in such a way that a previously described method can be implemented, or which includes a previously described computer.

Finally, the aim is achieved by a watercraft equipped with a sonar as previously described. Watercraft of this kind may, in particular, be ships or submarines.

Figure 2:
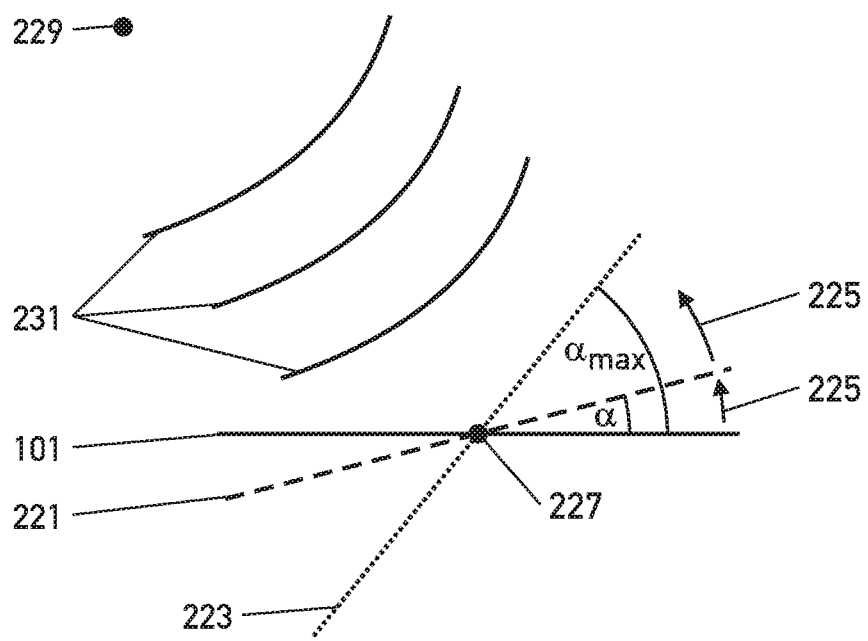
FIG. 2 is a very schematic representation of a computational rotation of the side-scan sonar from FIG. 1 and the underwater acoustic signals emitted by a waterborne sound source.
Figure 3:
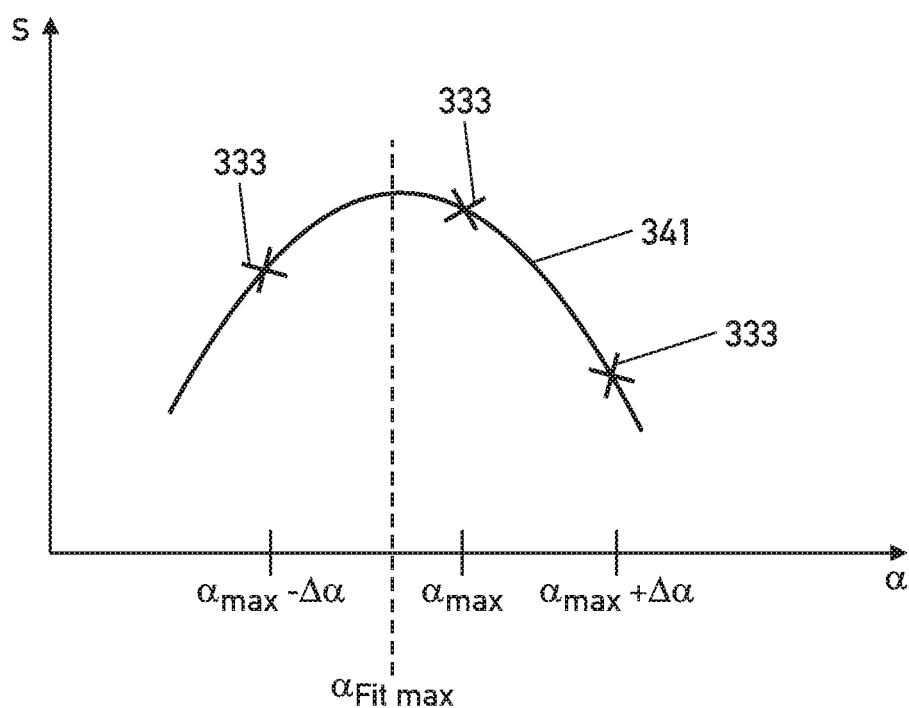
FIG. 3 shows a functional relationship between a cumulated signal strength S and a rotation angle α, as well as three associated measured values, and the determined mathematical fit function, as well as a global maximum associated with the mathematical fit function and the rotation angle which can be derived from it.

The invention is explained in more detail below with reference to an exemplary embodiment. The figures show the following:

FIG. 1 a very schematic representation of a side-scan sonar (flank array) with 151 individual hydrophones, which is arranged on a submarine, FIG. 2 a very schematic representation of a computational rotation of the side-scan sonar from FIG. 1 and the underwater acoustic signals emitted by a waterborne sound source, and FIG. 3 a functional relationship between a cumulated signal strength S and a rotation angle $\alpha$, as well as three associated measured values, and the determined mathematical fit function, as well as a global maximum associated with the mathematical fit function and the rotation angle which can be derived from it.

A side-scan sonar antenna 101 is arranged on a submarine 111. The side-scan sonar antenna 101 includes individual hydrophones 103, which have a piezoceramic element. The pressure differences impressed on the piezoceramic elements by the waterborne acoustic signal generate a voltage, which is metrologically processed and evaluated. This processing and evaluation takes place almost continuously. This results over time in an almost continuous signal voltage curve at a hydrophone. These voltage curves are convoluted with a temporal window filter, so that a measurement interval results.

The individual hydrophone signals are evaluated in each case at different times within the temporal filter window, so that what is effectively a computational rotation of the side-scan sonar antenna 101 results.

In the present case, the step width for rotation is $\Delta\alpha=2°$. In addition, a cumulated sum signal covering all hydrophones 103 is formed for each angle $\alpha$ formed thereby. The rotation is in the direction of rotation 225. Here, the rotation is about the pivot point 227, which in the present case is the center of the hydrophones—in this case, the central hydrophone with the number 76. As soon as the (rotated) side-scan sonar antenna 223 is rotated ($\alpha_{max}$), such that it essentially emits in parallel to the propagation waves 231 of the propeller signal 229, the maximum sum signal $S_{max}$ is obtained.

The direct sum signals around the maximum sum signal $S_{max}$ at the rotation angle $\alpha_{max}$ are extracted and fitted mathematically by means of a second-degree polynomial.

FIG. 3 shows not only the extracted measured values 333 with the corresponding rotation angles $\alpha$, but also a graphical representation of the determined fit function 341.

Here, the rotation angle $\alpha$ is shown in the graph on the independent axis, and the sum signal S on the dependent axis.

The maximum $\alpha_{fit,max}$ is identified for the determined mathematical fit function 341. This differs somewhat from the value ($\alpha_{max}$) determined by the rotation of the side-scan sonar. The maximum value $\alpha_{fit,max}$ thus obtained is a marked improvement upon the angular value $\alpha_{max}$ and gives the direction from the pivot point 227 to the point location of the sound source 229, thereby providing a bearing.

LIST OF REFERENCE SYMBOLS

101 Side-scan sonar antenna
103 Hydrophones
111 Submarine
221/223 Antenna pivoted electronically to antenna 101
225 Direction of rotation
227 Pivot point
229 Underwater sound sources
231 Underwater sound waves
333 Measured values
341 Graph of a fit function

The invention claimed is:

1. A method for determining the direction of a source of waterborne sound that emits a waterborne acoustic signal by means of a hydrophone arrangement which forms a linear antenna or a virtual linear antenna, wherein the method comprises the following steps:

determining the waterborne acoustic signal incoming at the hydrophone arrangement at a first measurement time $t_1$, performing an electronic antenna swing analysis which determines a sum signal S of the linear antenna or of the virtual signal antenna at every rotation angle $\alpha n=\alpha 0\pm n\Delta\alpha$, where $\alpha 0$ is the starting angle, $\Delta\alpha$ is the step-width angle, and n=0, 1, 2, 3, 4 . . . , such that a measurement series $S(\alpha)$ is created, determining a maximum sum signal, $S_{max}(\alpha_{max})$, where $\alpha_{max}$ represents the maximum rotation angle of the measurement series $S(\alpha)$, determining a fit measurement series $S_{Fit}(\alpha)$, which includes the maximum sum signal $S_{max}(\alpha_{max})$ and at least two more sum signals $S(\alpha_n)_m$, with the sum number m=2, 3, 4 . . . , determining a mathematical fit function $S_{Fit}(\alpha_{Fit})$ for the fit measurement series $S_{Fit}(\alpha)$ by means of a mathematical equalization calculation, and determining a fit function maximum $f_{Fit,Max}(\alpha_{Fit,Max})$ of the mathematical fit function $f_{Fit}(\alpha_{Fit})$, wherein the direction of the waterborne sound source can be determined by means of $\alpha_{Fit,Max}$.

2. Method according to claim 1, wherein the procedure or sub-steps of the procedure can be carried out at a second measurement time t2, at a third measurement time t3, at a fourth measurement time t4, and/or at further times t, wherein the corresponding measurement series $S(\alpha)_t$ or the determined directions of the waterborne sound source are averaged.

3. Method according to claim 2, wherein the remaining steps of the procedure are carried out according to claim 1.

4. Method according to claim 1, wherein the additional sum signals are sum signals adjacent to the maximum sum signal $S_{max}(\alpha_{max})$.

5. Method according to claim 1, wherein the mathematical fit function is a polynomial function, a Gaussian function, a Lorentz function, or a Voigt function.

6. An invention selected from the group consisting of:
(a) a computer program product which is set up so that the method according to claim 1 can be implemented with a computer or a sonar;
(b) a computer configured for carrying out a method according to claim 1;
(c) a sonar system for determining a direction of a source of a waterborne sound, the system comprising:
an antenna, wherein the antenna includes a plurality of piezoceramic elements, wherein the piezoceramic elements are configured to:
detect the waterborne acoustic sound; and
generate, based on the waterborne acoustic sound, a voltage;
a control circuit communicatively coupled to the plurality of piezoceramic elements, wherein the control circuit is configured to:
receive, from the plurality of piezoceramic elements at multiple points in time, the voltage;
perform an electronic swing analysis at a plurality of rotation angles at the multiple points in time;
determine, based on the electronic swing analysis, a maximum sum signal;
determine a fit measurement series, wherein the fit measurement series includes the maximum sum signal and at least two additional sum signals;
determine, based on a mathematical equalization calculation and the fit measurement series, a mathematical fit function; and
determine, based on the mathematical fit function, the direction of the source of the waterborne sound; and
(d) a sonar system configured for carrying out a method according to claim 1.

7. An invention according to claim 6, wherein the invention is (b) a computer configured for carrying out a method according to claim 1.

8. An invention according to claim 6, wherein the invention is (d) a sonar system configured for carrying out a method according to claim 1.

9. A watercraft which includes a sonar system configured for carrying out a method comprising the following steps:
determining the waterborne acoustic signal incoming at the hydrophone arrangement at a first measurement time $t_1$,
performing an electronic antenna swing analysis which determines a sum signal S of the linear antenna or of the virtual signal antenna at every rotation angle $\alpha n = \alpha 0 \pm n\Delta\alpha$, where $\alpha 0$ is the starting angle, $\Delta\alpha$ is the step-width angle, and $n=0, 1, 2, 3, 4 \ldots$, such that a measurement series $S(\alpha)$ is created,
determining a maximum sum signal $S_{max}(\alpha_{max})$, where $\alpha_{max}$ represents the maximum rotation angle of the measurement series $S(\alpha)$,
determining a fit measurement series $S_{Fit}(\alpha)$, which includes the maximum sum signal $S_{max}(\alpha_{max})$ and at least two more sum signals $S(\alpha_n)_m$, with the sum number $m=2, 3, 4 \ldots$,
determining a mathematical fit function $f_{Fit}(\alpha_{Fit})$ for the fit measurement series $S_{Fit}(\alpha)$ by means of a mathematical equalization calculation, and
determining a fit function maximum $f_{Fit,Max}(\alpha_{Fit,Max})$ of the mathematical fit function $f_{Fit}(\alpha_{Fit})$, wherein the direction of the waterborne sound source can be determined by means of $\alpha_{Fit,Max}$.

10. An invention according to claim 6, wherein the invention is (c) a sonar system for determining a direction of a source of a waterborne sound, the system comprising:
an antenna, wherein the antenna includes a plurality of piezoceramic elements, wherein the piezoceramic elements are configured to:
detect the waterborne acoustic sound; and
generate, based on the waterborne acoustic sound, a voltage;
a control circuit communicatively coupled to the plurality of piezoceramic elements, wherein the control circuit is configured to:
receive, from the plurality of piezoceramic elements at multiple points in time, the voltage;
perform an electronic swing analysis at a plurality of rotation angles at the multiple points in time;
determine, based on the electronic swing analysis, a maximum sum signal;
determine a fit measurement series, wherein the fit measurement series includes the maximum sum signal and at least two additional sum signals;
determine, based on a mathematical equalization calculation and the fit measurement series, a mathematical fit function; and
determine, based on the mathematical fit function, the direction of the source of the waterborne sound.

11. An invention according to claim 10, wherein in (c) the at least two additional sum signals are adjacent to the maximum sum signal.

12. An invention according to claim 11, wherein in (c) the at least two additional sum signals are symmetric about the maximum sum signal.

13. An invention according to claim 6, wherein in (c) the mathematical fit function is one of a polynomial function, a Gaussian function, a Lorentz function, and a Voigt function.

14. An invention according to claim 6, wherein in (c) the plurality of piezoceramic elements includes between 50 and 200 piezoceramic units.

15. An invention according to claim 6, wherein in (c) the plurality of piezoceramic elements form a side-scan sonar antenna.

16. An invention according to claim 15, wherein the side-scan sonar antenna is one of a linear antenna and a virtual linear antenna.

17. An invention according to claim 6, wherein in (c) there is a common step width between each of the plurality of rotation angles.

18. An invention according to claim 17, wherein in (c) the common step width is approximately two degrees.

19. An invention according to claim 6, wherein in (c) a total rotation for the plurality of rotation angles is one hundred eighty degrees.

20. An invention according to claim 6, wherein the invention is ($\alpha$) a computer program product which is set up so that the method according to claim 1 can be implemented with a computer or a sonar.

21. A ship or a submarine having a sonar system for determining a direction of a source of a waterborne sound, wherein the sonar system comprises:
   an antenna, wherein the antenna includes a plurality of piezoceramic elements, wherein the piezoceramic elements are configured to:
      (a) detect the waterborne acoustic sound; and
      (b) generate, based on the waterborne acoustic sound, a voltage;
   a control circuit communicatively coupled to the plurality of piezoceramic elements, wherein the control circuit is configured to:
      (i) receive, from the plurality of piezoceramic elements at multiple points in time, the voltage;
      (ii) perform an electronic swing analysis at a plurality of rotation angles at the multiple points in time;
      (iii) determine, based on the electronic swing analysis, a maximum sum signal;
      (iv) determine a fit measurement series, wherein the fit measurement series includes the maximum sum signal and at least two additional sum signals;
      (v) determine, based on a mathematical equalization calculation and the fit measurement series, a mathematical fit function; and
      (vi) determine, based on the mathematical fit function, the direction of the source of the waterborne sound.

22. A ship or a submarine according to claim 21, wherein the at least two additional sum signals are symmetric about the maximum sum signal.

23. A ship or submarine according to claim 21, wherein the plurality of piezoceramic elements form a side-scan sonar antenna.

\* \* \* \* \*